Jan. 30, 1968   H. D. HULTERSTRUM   3,366,504
THREADED PIPE FITTING
Filed March 30, 1964
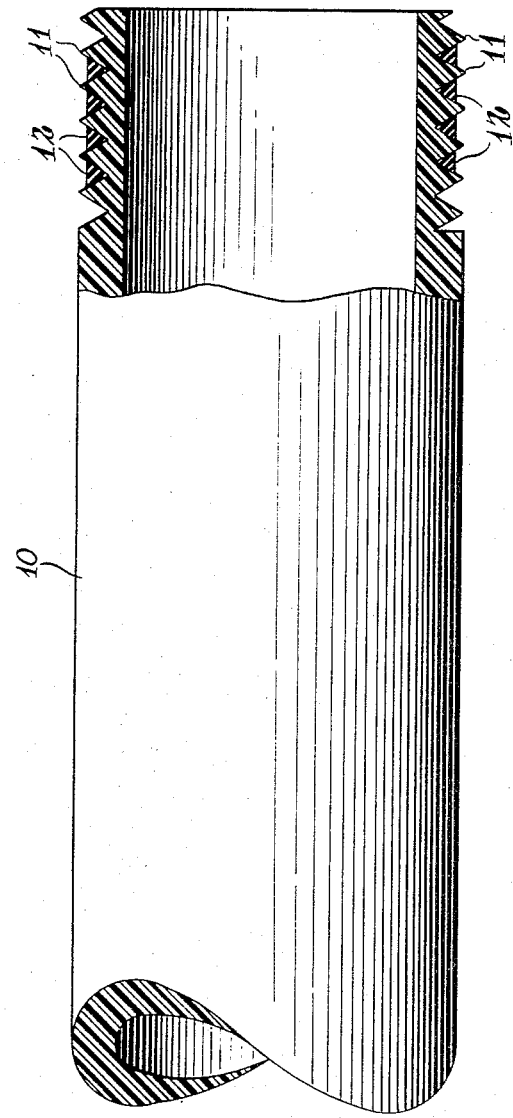
INVENTOR
HAROLD D. HULTERSTRUM
BY Bair, Freeman &
Molinare   Attys.

United States Patent Office 3,366,504
Patented Jan. 30, 1968

3,366,504
THREADED PIPE FITTING
Harold D. Hulterstrum, Baraboo, Wis., assignor to Flambeau Plastics Corporation, a corporation of Wisconsin
Filed Mar. 30, 1964, Ser. No. 355,962
2 Claims. (Cl. 117—37)

This invention relates to an improved threaded pipe fitting such as a union, coupling or the like, molded from plastic material. Such pipe fittings are equivalent to brass, which is commonly used for comparable metal fittings, except that they are subject to dimensional change, particularly with temperature variations.

For example, it has been found that fittings molded from nylon serve well in connecting gasoline tubes to the threaded inlets and outlets of engine carburetors, but begin to leak around the threads when subjected to elevated temperature and subsequently cooled. Such temperature variations may range up to 100° Fahrenheit or more due to the heat of the engine on which the carburetor is mounted, the climate, and other conditions. Thermoplastic materials such as nylon and polyolefins (polyethylene, polypropylene) from which threaded fittings are molded, are also subject to cold flow, i.e., slow movement of the plastic in response to pressure. Even a slight amount of cold flow will permit leakage of fluids such as gases and low viscosity liquids like gasoline. Tightening the male and female threaded parts stops leakage only temporarily until the plastic material flows away under the additional pressure, or until separation occurs due to dimensional changes brought about by temperature change.

It has been common practice when installing metal pipes to smear the threads of fittings with pipe dope, such as white lead in a drying oil or similar compounds which harden by oxidation. But in fitting small pipes and tubes which carry gasoline or fluids in temperature control systems containing sensitive parts such as regulators, this practice is undesirable because the dope gets into the conduit and may be carried downstream into sensitive apparatus to cause malfunction. Furthermore, it is preferable not to depend upon the workmen to apply the dope on the job because joints are missed every now and then.

It is the object of my invention to provide molded plastic threaded fittings having a sealant in the threads which is dry, nontacky, and resilient in nature; which is prepared at the factory where the fitting is molded, or prior to fitting in a conduit system; and which may be turned into its mating threaded part without any treatment on the job to provide a leak-tight joint which remains tight even under wide fluctuations in ambient temperature.

The single figure in the drawing is a side view, partly in section, of the threaded end of a molded plastic fitting made in accordance with my invention.

The molded plastic fitting is designated generally by the numeral 10 and has spiral threads molded on the external surface thereof indicated at 11. Although the part shown has external threads, it will be appreciated that the invention is also useful for female fittings which are internally threaded. The root area between the threads is filled with a resilient sealant compound 12 which terminates short of the crest of the threads. It will be noted that the initial and final threads are not treated but only the central threads. This precludes the possibility of the sealant being squeezed out on either end of the joint. Likewise, restricting the application to the root area of the threads prevents any squeezing out. Thus there is not possibility that sealant will get inside the pipe or conduit 10.

The sealant composition used must be of a rubbery nature with sufficient adhesive qualities to cling tenaciously to the plastic material. Yet it must dry to a relatively nontacky state so that the treated molded fittings may be thrown into a container without any possibility of the sealant wiping off one on to another. A suitable composition consists of a rubbery copolymer of butadiene and acrylonitrile (60 to 40 parts by weight, respectively) in methylethyl ketone solvent, 35% solids. In a preferred composition, 15 to 20 parts of a solid alkyd resin plasticizer-tackifier are admixed with 100 parts of rubbery copolymer and this admixture is cut with a suitable solvent such as methylethyl ketone to about 25% solids. The alkyd resins are well known in the art as viscous nonmigratory polyester plasticizers and are sold under the trademark "Paraplex G40," "Paraplex G60," by Rohm & Haas, and others. The alkyd resins embrace a family of compounds which vary in molecular weight from soft flowing materials to more solid materials. The molecular weight and the amount of the alkyd resin added are not critical but the molecular weight should be sufficiently high and the quantity sufficiently low to prevent the deposited sealant from being sticky after evaporation of the solvent. Sufficient methylethyl ketone or other solvent is added to the homogenous mixture of the butadiene acrylonitrile copolymer and the added resin to produce a viscous paste which can be applied with a suitable extruding apparatus, or manually with an applicator tool. The paste must not run due to gravity but must be sufficiently viscous to remain in place upon application. Sealant compositions with a viscosity of 1500 centipoises (Brookfield Viscosimeter RVF, 20 r.p.m., 25° centigrade, No. 3 spindle) are satisfactory. The applicator tool is designed to wipe away the excess sealant from the crest of the threads.

Variation in the sealant compound will be apparent to those skilled in the art. For example, pigments may be added and combinations of other plasticizers may be incorporated into the butadiene acrylonitrile copolymer rubber with the alkyd resin.

Upon application of the sealant, the methylethyl ketone volatilizes quickly, leaving the surface dry and substantially tack free. The deposit remaining adheres as a resilient cover or cushion which compensates for any normal change in dimension which might cause the threads of the fitting to become slightly spaced from the corresponding threads in its mating part. Thus, a leak-tight point is produced which is not affected by change in temperature or by plastic flow of the material from which the fitting is molded.

I claim:

1. A plastic pipe fitting molded from a thermoplastic resin and having integral spiral threads thereon, a rubbery sealant deposited in the root area between said threads, but not over the crest of the threads, said rubbery sealant consisting essentially of a plasticized copolymer of butadiene and acrylonitrile, the quantity of butadiene present being sufficient to impart rubbery characteristics to said sealant.

2. The pipe fitting of claim 1 in which said resin is nylon or a polyolefin and said sealant plasticizer is an alkyd resin present in a quantity below that at which the sealant becomes tacky after application to the fitting.

References Cited

UNITED STATES PATENTS

| | | | |
|---|---|---|---|
| 2,824,024 | 2/1958 | Chapman | 117—76 |
| 2,827,313 | 3/1958 | Conner | 285—328 X |
| 3,030,230 | 4/1962 | Atwell | 117—138.8 X |
| 3,101,207 | 8/1963 | Pavel et al. | 117—94 X |
| 3,146,142 | 8/1964 | Maly | 285—423 X |

RALPH S. KENDALL, *Primary Examiner.*